(12) United States Patent
Sasaki

(10) Patent No.: US 11,378,800 B2
(45) Date of Patent: Jul. 5, 2022

(54) IMAGE DISPLAY APPARATUS

(71) Applicant: SAMSUNG ELECTRONICS CO., LTD., Suwon-si (KR)

(72) Inventor: Katsutoshi Sasaki, Yokohama (JP)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 702 days.

(21) Appl. No.: 16/239,119

(22) Filed: Jan. 3, 2019

(65) Prior Publication Data

US 2019/0212556 A1   Jul. 11, 2019

(30) Foreign Application Priority Data

Jan. 11, 2018   (JP) .............................. JP2018-002332
Sep. 11, 2018   (KR) ........................ 10-2018-0108237

(51) Int. Cl.
*G02B 27/01*   (2006.01)
*G02B 26/08*   (2006.01)
(Continued)

(52) U.S. Cl.
CPC ..... *G02B 27/0103* (2013.01); *G02B 26/0833* (2013.01); *G02B 26/10* (2013.01);
(Continued)

(58) Field of Classification Search
CPC .. G02B 26/105; G02B 26/101; G02B 26/123; G02B 26/0833; G02B 26/10; G02B 21/0048; G02B 26/0816; G02B 26/0841; G02B 7/1821; G02B 26/0875; G02B 26/12; G02B 26/125; G02B 13/0095; G02B 26/085; G02B 27/30; G02B 17/0663; G02B 21/002; G02B 21/16; G02B 23/24; G02B 26/08; G02B 26/0891; G02B 26/121; G02B 26/124; G02B 26/127; G02B 27/0031; G02B 27/017; G02B 27/28; G02B 27/48; G02B 13/143; G02B 17/0657; G02B 21/0028; G02B 21/0032; G02B 21/008; G02B 21/0084; G02B 21/365;
(Continued)

(56) References Cited

U.S. PATENT DOCUMENTS 6,906,836 B2   6/2005   Parker et al.
8,876,294 B2   11/2014   Saisho et al.
(Continued)

FOREIGN PATENT DOCUMENTS

JP   2016-14861 A   1/2016

*Primary Examiner* — Collin X Beatty
*Assistant Examiner* — Grant A Gagnon
(74) *Attorney, Agent, or Firm* — Sughrue Mion, PLLC

(57) ABSTRACT

An image display apparatus includes a scanning optical unit configured to scan a laser light, a beam shaper configured to receive the laser light scanned by the scanning optical unit in a direction normal to a surface of the beam shaper, an illumination optical unit configured to transmit the laser light emitted from the beam shaper to a display panel, the illumination optical unit including an anamorphic lens and two reflective optical elements having free-form surfaces, the display panel configured to display an image based on the laser light transmitted by the illumination optical unit, and an eyepiece optical unit configured to concentrate an image light emitted from the display panel to an eye of an observer, the eyepiece optical unit including three reflective optical elements having free-form surfaces.

20 Claims, 13 Drawing Sheets

(51) Int. Cl.
*G02B 26/10* (2006.01)
*G02B 27/09* (2006.01)
*G02B 27/10* (2006.01)
*B60K 35/00* (2006.01)

(52) U.S. Cl.
CPC ........ *G02B 26/105* (2013.01); *G02B 27/0101* (2013.01); *G02B 27/0149* (2013.01); *G02B 27/0179* (2013.01); *G02B 27/0944* (2013.01); *G02B 27/1006* (2013.01); *B60K 35/00* (2013.01); *B60K 2370/334* (2019.05); *B60K 2370/52* (2019.05); *G02B 2027/014* (2013.01); *G02B 2027/0118* (2013.01); *G02B 2027/0132* (2013.01); *G02B 2027/0159* (2013.01); *G02B 2027/0187* (2013.01)

(58) Field of Classification Search
CPC ........ G02B 2207/113; G02B 2207/117; G02B 23/2407; G02B 26/00; G02B 26/007; G02B 26/0825; G02B 26/0858; G02B 26/0883; G02B 26/126; G02B 27/0068; G02B 27/0977; G02B 27/14; G02B 27/18; G02B 27/4205; G02B 3/0025; G02B 3/0031; G02B 3/005; G02B 3/0068; G02B 3/0075; G02B 3/04; G02B 3/14; G02B 5/1828; G02B 5/1876; G02B 5/189; G02B 6/266; G02B 6/29311; G02B 6/29383; G02B 6/32; G02B 6/352; G02B 6/356; G02B 6/3594; B60K 2370/52; B60K 2370/334; B60K 35/00
USPC ......................................................... 359/201
See application file for complete search history.

(56) References Cited

U.S. PATENT DOCUMENTS

| | | |
|---|---|---|
| 9,081,180 B2 | 7/2015 | Lee |
| 2015/0219803 A1 | 8/2015 | Inamoto et al. |
| 2017/0146803 A1 | 5/2017 | Kishigami et al. |
| 2017/0184843 A1 | 6/2017 | Kuzuhara et al. |
| 2017/0201068 A1 | 7/2017 | Furuya et al. |
| 2017/0336222 A1 | 11/2017 | Yamaguchi et al. |

IMAGE DISPLAY APPARATUS

CROSS-REFERENCE TO RELATED APPLICATION

This application claims priority from Japanese Patent Application No. JP-P-2018-002332, filed on Jan. 11, 2018 in the Japanese Patent Office and Korean Patent Application No. 10-2018-0108237, filed on Sep. 11, 2018 in the Korean Intellectual Property Office, the disclosures of which are incorporated herein by reference in their entireties.

BACKGROUND

1. Field

One or more exemplary embodiments of the present disclosure relate to methods and apparatuses of an image display apparatus.

2. Description of the Related Art

A head-up display (HUD) may display a virtual image so that the virtual image may be superimposed on a real scene of a front view of a vehicle, to generate an augmented reality (AR) in which information is added to the real scene. The HUD may contribute to safe and comfortable driving of a vehicle by more accurately providing desired information to an observer driving the vehicle while suppressing movement of observer's gaze as much as possible.

SUMMARY

According to an aspect of an exemplary embodiment, there is provided an image display apparatus including a scanning optical unit configured to scan a laser light, a beam shaper configured to receive the laser light scanned by the scanning optical unit in a direction normal to a surface of the beam shaper, an illumination optical unit configured to transmit the laser light emitted from the beam shaper to a display panel, the illumination optical unit including an anamorphic lens and two reflective optical elements having free-form surfaces, the display panel configured to display an image based on the laser light transmitted by the illumination optical unit, and an eyepiece optical unit configured to concentrate an image light emitted from the display panel to an eye of an observer, the eyepiece optical unit including three reflective optical elements having free-form surfaces.

The image display apparatus may further including a first controller configured to control a position of the beam shaper based on position information of the eye.

The scanning optical unit may include a laser scanner, and the first controller may be further configured to control the laser scanner to control the position of the beam shaper.

The first controller may be further configured to control the position of the beam shaper and to control the image light to be concentrated based on a change in a position of the eye in a direction perpendicular to an optical axis of the eye.

The image display apparatus may further include a second controller configured to control a position of the beam shaper based on a position information of the eye.

The second controller may be further configured to control the beam shaper to move with respect to an optical axis of the eye.

The second controller may be further configured to concentrate the image light by controlling the position of the beam shaper based on the beam shaper moving with respect to an optical axis of the eye.

The beam shaper may include one of a diffractive optical element (DOE), a holographic optical element (HOE), and a diffuser plate.

The image display apparatus may further include a third controller configured to control content of the image based on a position information of the eye.

The third controller may be further configured to provide a right eye image and a left eye image for the right eye and the left eye, respectively.

The scanning optical unit may include a light source configured to emit the laser light, a laser scanner configured to scan the laser light emitted from the light source, and a mirror configured to reflect the laser light scanned by the laser scanner toward the beam shaper.

The laser scanner may include a microelectromechanical systems (MEMS) scanner, and the mirror may include a parabolic mirror.

The light source may include a condensing lens configured to concentrate the laser light to a diffuser plate, the diffuser plate configured to scatter the laser light concentrated by the condensing lens, a collimating lens configured to emit parallel rays by collimating the laser light scattered by the diffuser plate to the laser scanner, and a motor configured to rotate the diffuser plate.

The eyepiece optical unit may include a front free-form surface mirror configured to reflect the image light emitted from the display panel, a back free-form surface mirror configured to reflect the image light reflected by the front free-form surface mirror, and a combiner configured to concentrate the image light to the eye by reflecting the image light reflected by the back free-form surface mirror.

The front free-form surface mirror and the back free-form surface mirror may be disposed so that at least two image lights reflected from the front free-form surface mirror intersect between optical paths from the front free-form surface mirror to the back free-form surface mirror.

The combiner and the back free-form surface mirror may be disposed so that at least two image lights reflected from the back free-form surface mirror intersect between optical paths from the back free-form surface mirror to the combiner.

The image display apparatus may be a head-up display (HUD).

The display panel may include a hologram display device.

The light source may be configured to generate a white light by combining a red laser light, a green laser light and a blue laser light.

The light source may include semiconductor laser light sources disposed in an array.

BRIEF DESCRIPTION OF THE DRAWINGS

The above and/or other aspects will be more apparent by describing certain exemplary embodiments with reference to the accompanying drawings, in which.

DETAILED DESCRIPTION

Figure 1:
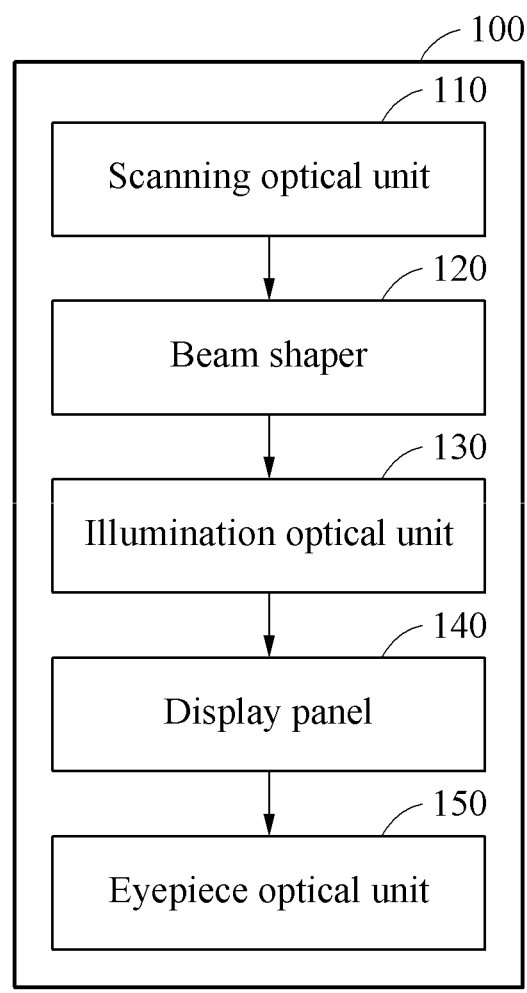
FIG. 1 is a block diagram illustrating a configuration of an image display apparatus according to an exemplary embodiment.

Reference will now be made in detail to exemplary embodiments, examples of which are illustrated in the accompanying drawings, wherein like reference numerals refer to the like elements throughout. Exemplary embodiments are described below in order to explain the present disclosure by referring to the figures.

Various modifications may be made to exemplary embodiments. However, it should be understood that these exemplary embodiments are not construed as limited to the illustrated forms and include all changes, equivalents or alternatives within the idea and the technical scope of this disclosure.

The terminology used herein is for the purpose of describing particular exemplary embodiments only and is not intended to be limiting. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. It will be further understood that the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Unless otherwise defined, all terms including technical and scientific terms used herein have the same meaning as commonly understood by one of ordinary skill in the art to which exemplary embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the exemplary embodiments with reference to the accompanying drawings, like reference numerals refer to like constituent elements and a repeated description related thereto will be omitted. When it is determined detailed description related to a related known function or configuration they may make the purpose of the examples unnecessarily ambiguous in describing the examples, the detailed description will be omitted here.

FIG. 1 is a block diagram illustrating a configuration of an image display apparatus according to an exemplary embodiment.

Referring to FIG. 1, an image display apparatus 100 includes a scanning optical unit 110, a beam shaper 120, an illumination optical unit 130, a display panel 140, and an eyepiece optical unit 150.

The scanning optical unit 110 may scan a laser light.

The beam shaper 120 may receive the scanned laser light from the scanning optical unit 110. For example, the laser light scanned by the scanning optical unit 110 may be substantially vertically incident on the beam shaper 120. The laser light scanned by the scanning optical unit 110 may be incident at an angle perpendicular to a surface of the beam shaper 120 or at an angle similar to the angle perpendicular to the surface. The angle similar to the angle perpendicular to the surface may be an angle having an angle difference with the angle perpendicular to the surface which is less than a predetermined threshold angle.

The illumination optical unit 130 may illuminate the display panel 140 with a laser light emitted from the beam shaper 120.

The display panel 140 may display an image using a laser light emitted by the illumination optical unit 130. For example, the display panel 140 may generate an image light corresponding to an image by passing a laser light emitted by the illumination optical unit 130. The image light may be a light that passes through an arbitrary point of the display panel 140. The image light may include a bundle of rays emitted from an arbitrary point of the display panel 140.

The eyepiece optical unit 150 may concentrate the image light emitted from the display panel 140 to an eye of an observer.

The image display apparatus 100 may be, for example, a head-up display (HUD) included in a vehicle, and may display a virtual image so that the virtual image may be superimposed on a view of a real scene in front of a vehicle including the image display apparatus 100. The image display apparatus 100 may generate an augmented reality (AR) by adding information to the real scene. However, applying of the image display apparatus 100 to an HUD is merely an example, and the image display apparatus 100 may also be applicable to other devices.

The image display apparatus 100 may more efficiently concentrate an image light emitted from an HUD to an eye of an observer. For example, to display an image on an entire eye box, the image display apparatus 100 may concentrate an image light to an eye of an observer. The image display apparatus 100 may concentrate different image lights to both eyes of an observer, respectively. Thus, the image display apparatus 100 may provide a left eye image to a left eye of the observer and provide a right eye image to a right eye of the observer, to provide a stereoscopic image to the observer.

Figure 2:
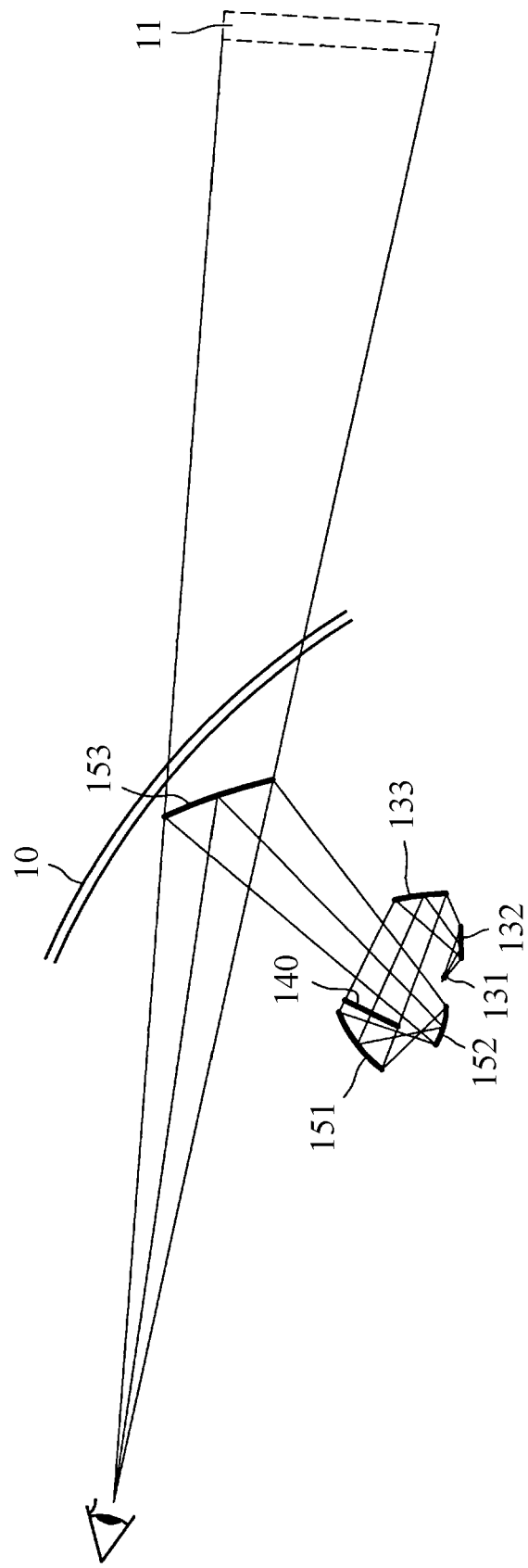
FIG. 2 is a diagram illustrating a configuration of an image display apparatus and a position relationship between a windshield glass and a virtual image according to an exemplary embodiment.
Figure 3:
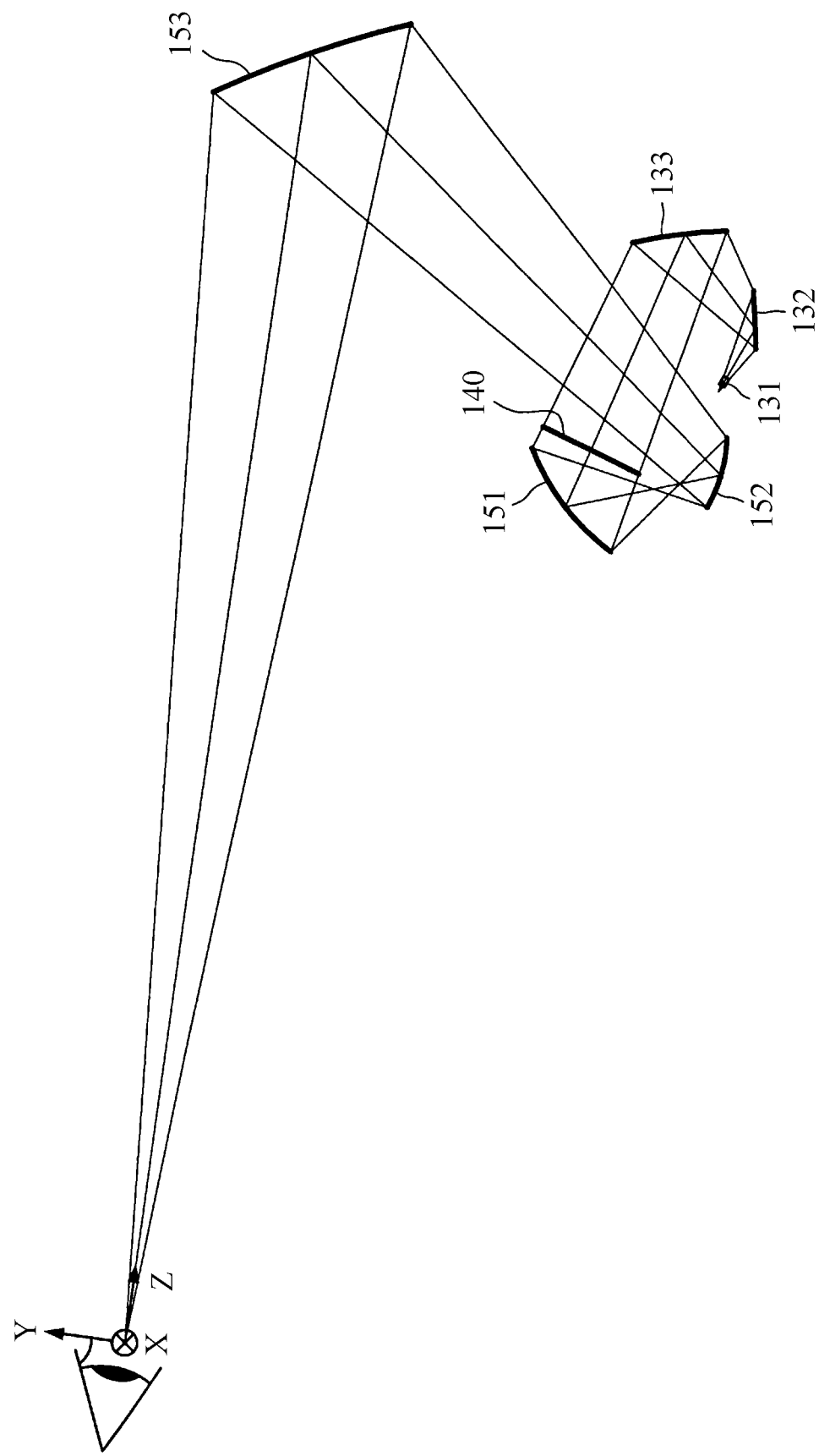
FIG. 3 is a diagram illustrating a configuration of an image display apparatus according to an exemplary embodiment.

FIG. 2 is a diagram illustrating a configuration of an image display apparatus and a position relationship between a windshield glass and a virtual image according to an exemplary embodiment. FIG. 3 is a diagram illustrating a configuration of an image display apparatus according to an exemplary embodiment.

The scanning optical unit 110 may scan a laser light to the beam shaper 120. Also, the beam shaper 120 may emit a laser light to the illumination optical unit 130. Scanning of the laser light by the scanning optical unit 110 and the beam shaper 120 will be further described below with reference to FIGS. 5 and 6.

The laser light emitted from the beam shaper 120 may be incident on the illumination optical unit 130. The laser light may be transferred to the illumination optical unit 130 in an order of an anamorphic lens 131, a first free-form surface mirror 132 and a second free-form surface mirror 133 that are included in the illumination optical unit 130.

A corresponding laser light may be reflected from the second free-form surface mirror 133 to the display panel 140. The display panel 140 may display an image using the laser light. For example, the display panel 140 may be a transmissive panel, and may receive a laser light through a rear surface and emit an image light based on the received laser light. The image light emitted from the display panel 140 may be incident on the eyepiece optical unit 150.

The image light may be propagated to the eyepiece optical unit 150 in an order of a third free-form surface mirror 151, a fourth free-form surface mirror 152 and a combiner 153 that are included in the eyepiece optical unit 150. An image light reflected by the combiner 153 may be concentrated on an eye of an observer. Accordingly, the observer may recognize, using a windshield glass 10, a virtual image that is superimposed on a real scene in front of a vehicle and that is displayed on a projection plane 11, as shown in FIG. 2.

The image display apparatus 100 may continue to concentrate the image light to the eye of the observer by controlling a predetermined optical element. For example, when a position of the eye is changed, the image display apparatus 100 may control a position or a movement of the predetermined optical element based on position information of the eye. The image display apparatus 100 may control a position of an optical element in response to a change in the position of the eye, to continue to concentrate the image light to the eye of the observer. The position information of the eye may be information that indicates the position of the eye and that is generated by an analysis of predetermined sensing data, but exemplary embodiments are not limited thereto, and a method of generating the position information is not particularly limited. Also, the position information of the eye may be generated by an external device, or the image display apparatus 100. For example, an image light may be concentrated to both eyes of the observer as well as one of the eyes.

The image display apparatus 100 may concentrate different image lights to both of the eyes of the observer, respectively. The image display apparatus 100 may provide different image lights to both of the eyes so that the observer may recognize a three-dimensional (3D) image. For example, the image display apparatus 100 may concentrate an image light of a left eye image and an image light of a right eye image to both of the eyes, respectively. In this example, the left eye image and the right eye image may have a disparity.

Hereinafter, each of components of the image display apparatus 100 will be described in detail.

Figure 4:
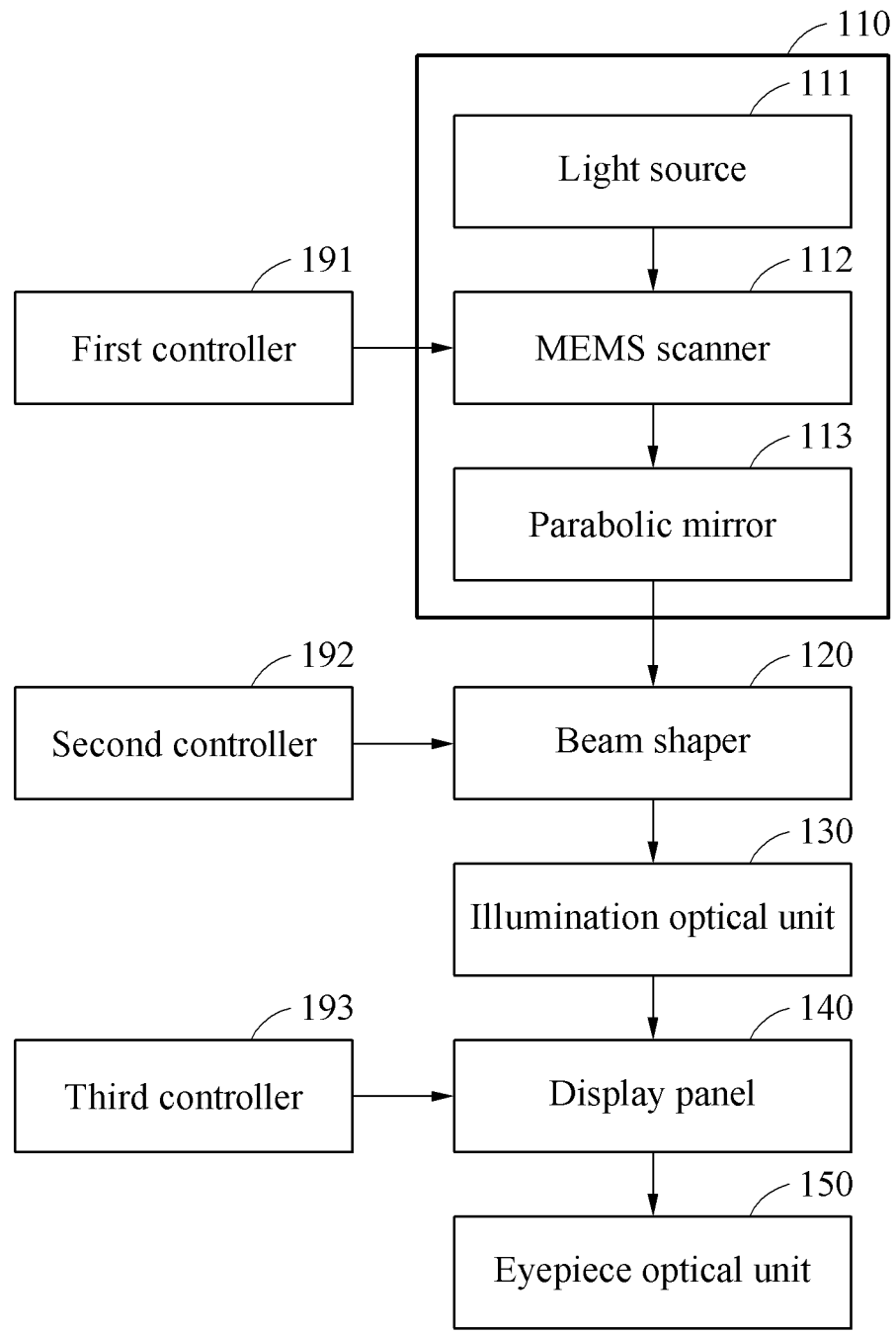
FIG. 4 is a diagram illustrating each controller included in an image display apparatus according to an exemplary embodiment.
Figure 5:
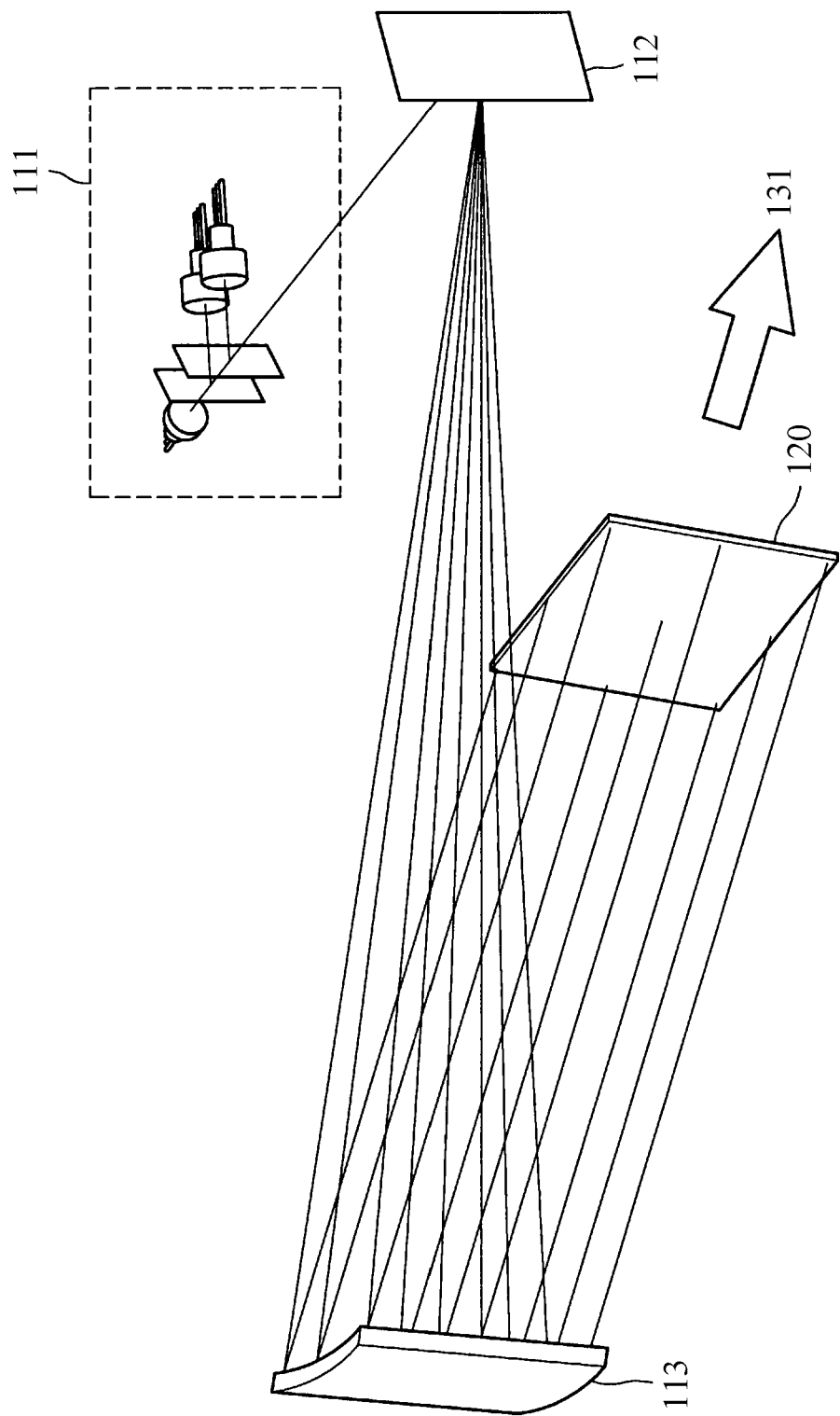
FIG. 5 is a diagram illustrating an example of a configuration of each of a scanning optical unit and a beam shaper according to an exemplary embodiment.

FIG. 4 is a diagram illustrating each controller included in an image display apparatus according to an exemplary embodiment. FIG. 5 is a diagram illustrating an example of a configuration of each of a scanning optical unit and a beam shaper according to an exemplary embodiment.

Referring to FIG. 4, a scanning optical unit 110 may include a light source 111, a laser scanner, for example, a microelectromechanical systems (MEMS) scanner 112, and a parabolic mirror 113. Also, the scanning optical unit 110 may be located in a dead space formed when an illumination optical unit 130 and an eyepiece optical unit 150 are disposed. The dead space may be a space other than a space occupied by the illumination optical unit 130 and the eyepiece optical unit 150 within a space defined by a housing of the image display apparatus 100. Thus, the size of the image display apparatus 100 may be miniaturized.

The light source 111 may be an optical element to generate a laser light, for example, white light. An example of a configuration of the light source 111 will be described below with reference to FIG. 6.

The MEMS scanner 112 may be an optical element to scan a laser light incident from the light source 111. For example, the MEMS scanner 112 may be located at a focal position of the parabolic mirror 113. The laser light scanned by the MEMS scanner 112 may be reflected by the parabolic mirror 113 to be incident on a beam shaper 120. In this example, when the laser light emitted from the focal position of the parabolic mirror 113 is reflected from each of the points on the parabolic mirror 113, traveling directions of reflected lights may be substantially parallel to an optical axis of the parabolic mirror 113. The reflected lights that are substantially parallel to each other may be substantially vertically incident on a surface of the beam shaper 120. An optical axis may be a line indicating an optical path through which light passes.

Also, the image display apparatus 100 may further include a first controller 191 configured to control a position of the beam shaper 120 on which a laser light is incident, based on position information of an eye of an observer. The first controller 191 may control the MEMS scanner 112 to control a position of the beam shaper 120 on which a laser light reflected by the parabolic mirror 113 is incident. An angle of incidence of the laser light remains unchanged despite a change in the position of the beam shaper 120 on which the laser light is incident. Also, the laser light may be incident on the beam shaper 120 at an angle that is substantially perpendicular to the surface of the beam shaper 120 despite a change in the position of the beam shaper 120 on which the laser light is incident. The MEMS scanner 112 may operate as the first controller 191.

In an optical system of the image display apparatus 100, the beam shaper 120 may be in a corresponding relationship with a position of an eye of an observer. When the position of the beam shaper 120 on which the laser light is incident changes, a position at which an image light is finally concentrated may also change. Thus, the image display apparatus 100 may determine a position of the beam shaper 120 on which the laser light is incident, based on a change in the position of the eye of the observer. For example, the first controller 191 may control a position of the beam shaper 120 on which the scanned laser light is incident, to concentrate the image light in response to a change in a position in a direction perpendicular to an optical axis of the eye. The position of the eye of the observer may be assumed to change in a direction substantially perpendicular to the optical axis of the eye. In response to the above change in the position of the eye, the first controller 191 may control the MEMS scanner 112 so that a laser light may be incident on a point of the beam shaper 120 corresponding to the changed position. Thus, the image display apparatus 100 may continue to concentrate an image light to the eye of the observer.

The MEMS scanner 112 may generate different image lights, that is, a right eye image light and a left eye image light that respectively correspond to a right eye image and a left eye image, by adjusting a position of the beam shaper 120 on which a laser light is incident. For example, the MEMS scanner 112 may operate at a relatively high speed, to alternately scan laser lights to a point corresponding to a left eye and a point corresponding to a right eye on the beam shaper 120 based on a time series. The laser light incident on the point of the beam shaper 120 corresponding to the left eye may be converted into a left eye image light by the display panel 140 and may be concentrated to the left eye. The laser light incident on the point of the beam shaper 120 corresponding to the right eye may be converted into a right eye image light by the display panel 140 and may be concentrated to the right eye. Thus, the MEMS scanner 112 may scan laser lights to provide the right eye image and the left eye image that are different from each other, to the observer at a relatively high speed. The image display apparatus 100 may provide the right eye image and the left eye image to the observer through a high-speed operation of the MEMS scanner 112, so that the observer may recognized a 3D image.

Although the scanning optical unit 110 includes the MEMS scanner 112 as shown in FIG. 4, exemplary embodiments are not limited thereto. In an example, the scanning optical unit 110 may include an optical element to scan a laser light, in addition to the MEMS scanner 112. In another example, the scanning optical unit 110 may include an optical element to enable a laser light to be incident substantially perpendicular to the beam shaper 120, in addition to the parabolic mirror 113.

The beam shaper 120 may be an optical element to transfer a laser light reflected by the parabolic mirror 113 to the illumination optical unit 130. The beam shaper 120 may change a travelling direction of the laser light reflected by the parabolic mirror 113 through a diffraction phenomenon. Also, the beam shaper 120 may change a beam configuration of the laser light. The beam shaper 120 may be implemented as, for example, a circuit optical element, such as a diffractive optical element (DOE), a holographic optical element (HOE), or a diffuser plate.

As described above, the laser light reflected by the parabolic mirror 113 may be substantially vertically incident on a surface of the beam shaper 120. The beam shaper 120 may typically broaden a beam diameter of an incident laser light to a threshold diameter, and may change a shape, for example, a circle shape, of the laser light to a rectangular shape. A changed shape of the laser light is not limited to the rectangular shape, and may be a shape similar to a rectangle. The threshold diameter may be determined depending on a design, and may be, for example, a diameter corresponding to a cone angle of an illumination light in the illumination optical unit 130. The beam diameter of the laser light may be a diameter of the laser light in a travelling direction of the laser light.

Also, the image display apparatus 100 may further include a second controller 192 configured to control a position of the beam shaper 120 based on position information of an eye of an observer. For example, the second controller 192 may control the beam shaper 120 to move back and forth with respect to an optical axis. A back-and-forth direction with respect to the optical axis may be, for example, a direction substantially perpendicular to the surface of the beam shaper 120. The direction substantially perpendicular to the surface of the beam shaper 120 may be a direction perpendicular to the surface of the beam shaper 120 or a direction similar to the direction perpendicular to the surface of the beam shaper 120.

As described above, in the optical system of the image display apparatus 100, the beam shaper 120 may have a corresponding relationship with a position of an eye of an observer. In response to the eye of the observer moving back and forth with respect to the optical axis, the second controller 192 may change the position of the beam shaper 120 to a position corresponding to a change in the position of the eye of the observer. Thus, even though the eye of the observer moves back and forth with respect to the optical axis, the image display apparatus 100 may continue to concentrate an image light to the eye. However, a method of changing the position of the beam shaper 120 is not limited thereto.

Also, the image display apparatus 100 may control content of an image based on the position of the eye of the observer. For example, when the position of the eye changes in a state in which a 3D image at a predetermined viewpoint is displayed, the image display apparatus 100 may change the content of the image to a 3D image at a viewpoint after the change in the position of the eye. The image display apparatus 100 may further include a third controller 193 configured to control content of an image based on position information of the eye of the observer. The third controller 193 may change the content of the image by controlling the display panel 140. For example, when a 3D image is visualized at a first viewpoint, a position of an eye of an observer may be changed to a second viewpoint. In this example, in response to the eye being moved from the first viewpoint to the second viewpoint, the third controller 193 may change content corresponding to the first viewpoint to content corresponding to the second viewpoint. The content corresponding to the first viewpoint may be content of a 3D object observed at the first viewpoint, and the content corresponding to the second viewpoint may be a 3D content observed at the second viewpoint. Thus, the image display apparatus 100 may continue to provide an appropriate image at a corresponding viewpoint to the observer despite a change in the position of the eye of the observer.

Figure 6:
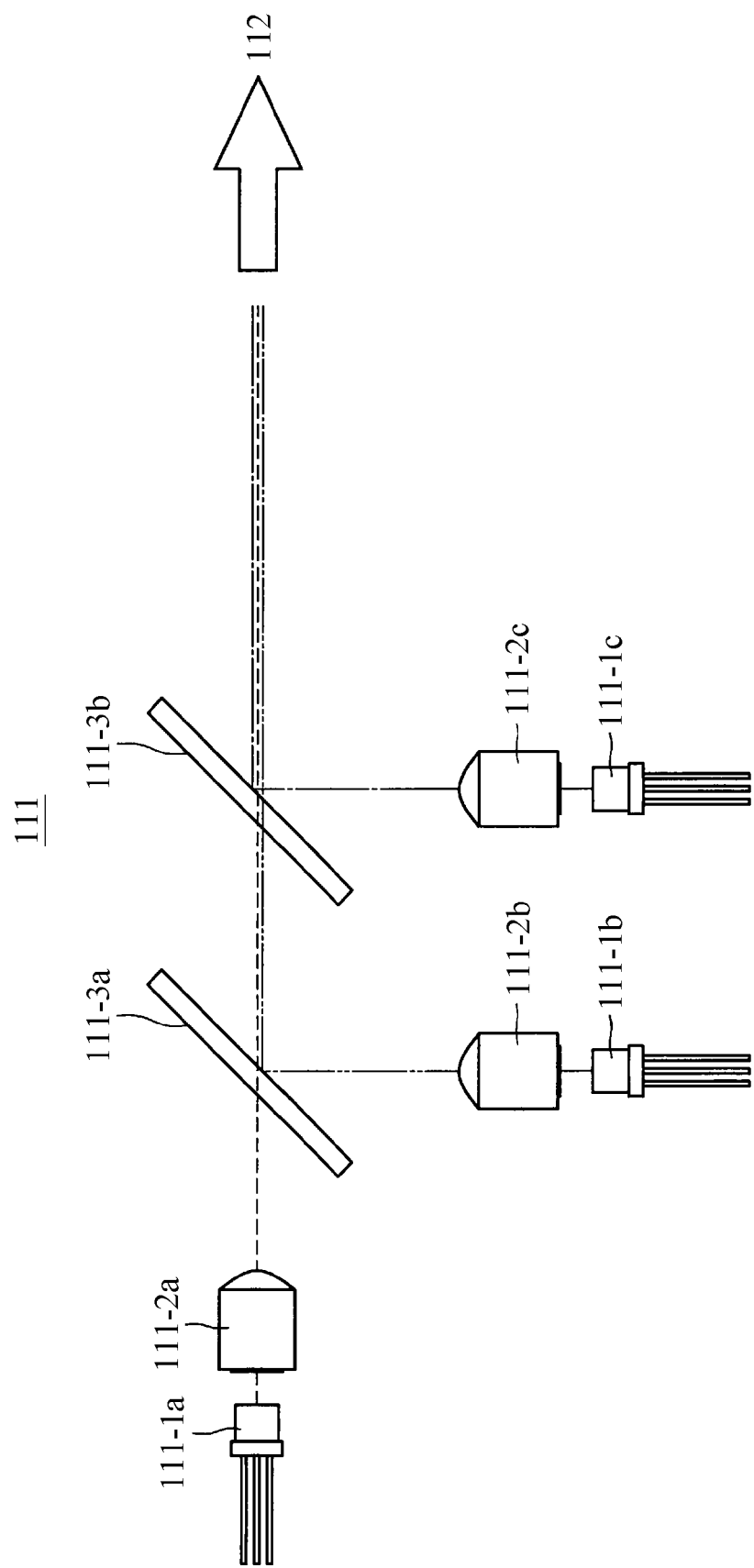
FIG. 6 is a diagram illustrating an example of a configuration of a light source according to an exemplary embodiment.

FIG. 6 is a diagram illustrating an example of a configuration of a light source according to an exemplary embodiment.

The light source 111 may be configured to generate a white light by combining a red laser light, a green laser light and a blue laser light, by, for example, multiplexing. For example, referring to FIG. 6, the light source 111 may include an R light source 111-1a, a G light source 111-1b, a B light source 111-1c, collimating lenses 111-2a, 111-2b and 111-2c, and dichroic mirrors 111-3a and 111-3b.

Each of the R light source 111-1a, the G light source 111-1b and the B light source 111-1c may emit a laser light with a peak intensity in an individual wavelength band. The R light source 111-1a may be a laser light with a peak intensity in a red wavelength band, and may emit a red light. The G light source 111-1b may be a laser light with a peak intensity in a green wavelength band, and may emit a green light. The B light source 111-1c may be a laser light with a peak intensity in a blue wavelength band, and may emit a blue light.

A laser light source used in the light source 111 is not limited thereto. For example, a semiconductor laser light source may be used as a laser light source. The R light source 111-1a may include, for example, a gallium indium phosphide (GaInP) quantum well laser diode using a GaInP semiconductor, and the G light source 111-1b and the B light source 111-1c may include, for example, gallium indium nitride (GaInN) quantum well laser diodes using GaInN semiconductors. The laser light source may be implemented as a semiconductor laser light source, and thus the light source 111 may be miniaturized.

Laser lights emitted from the R light source 111-1a, the G light source 111-1b and the B light source 111-1c may pass through the collimating lenses 111-2a through 111-2c respectively corresponding to the R light source 111-1a, the G light source 111-1b and the B light source 111-1c, to be substantially parallel laser lights. The red light emitted from the R light source 111-1a may pass through the dichroic mirrors 111-3a and 111-3b. An optical path of the green light emitted from the G light source 111-1b may be changed by the dichroic mirror 111-3a. The dichroic mirror 111-3a may be a mirror having a characteristic of transmitting a light with a greater wavelength than that of the red light and reflecting the green light. The green light of which the optical path is changed by the dichroic mirror 111-3a may be combined with the red light. A bundle of rays combined with the green light and the red light may pass through the dichroic mirror 111-3b. The dichroic mirror 111-3b may be a mirror having a characteristic of transmitting a light with a greater wavelength than that of the green light and reflecting the blue light. An optical path of the blue light emitted from the B light source 111-1c may be changed by the dichroic mirror 111-3b. The blue light of which the optical path is changed by the dichroic mirror 111-3b may be combined with the red light and the green light. Thus, the light source 111 may generate a white light by combining the red light, the green light, and the blue light. The light source 111 may emit the generated white light to the MEMS scanner 112, as described above.

However, exemplary embodiments of the configuration of the light source 111 are not limited to the above description. For example, instead of the light source 111, a semiconductor laser light source including all an R light source, a G light source and a B light source may also be used. Also, the light source 111 may also emit a laser light in a wavelength band other than wavelength bands of the red light, the green light and the blue light.

Figure 7:
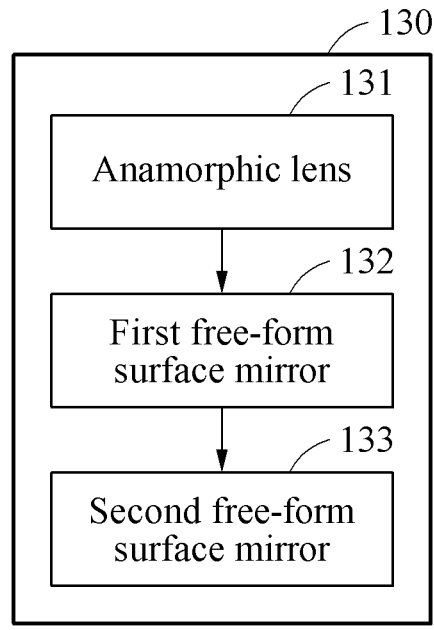
FIG. 7 is a block diagram illustrating a configuration of an illumination optical unit according to an exemplary embodiment.

FIG. 7 is a block diagram illustrating a configuration of an illumination optical unit according to an exemplary embodiment.

Referring to FIG. 7, an illumination optical unit 130 may include an anamorphic lens 131, a first free-form surface mirror 132, and a second free-form surface mirror 133.

The anamorphic lens 131 may be an optical element to broaden a laser light incident from the beam shaper 120, and may expand a laser light in at least one of a minor-axis direction and a major-axis direction of the anamorphic lens 131. The anamorphic lens 131 may be, for example, a half cylindrical lens, such as a lenticular lens. When the anamorphic lens 131 is a lenticular lens, a minor-axis direction may be a direction corresponding to a line crossing, at a short distance, a cross section of one of a plurality of half cylindrical lenses forming the lenticular lens. A direction corresponding to a line crossing, at a shortest distance, a cross section of a half cylindrical lens orthogonal to an optical axis may be a minor-axis direction, and a direction corresponding to a line crossing, at a longest distance, the cross section may be a major-axis direction. For example, the anamorphic lens 131 may have an optical characteristic, for example, a focal length, that may be orthogonal to the optical axis and that may have different curvatures in two directions that are orthogonal to each other. It is possible to more efficiently illuminate substantially the entire surface of the display panel 140 by the beam shaper 120 and the anamorphic lens 131. One surface of the anamorphic lens 131 may have an anamorphic surface that will be defined by an equation shown below. The other surface of the anamorphic lens 131 may be a plane, but is not limited thereto.

The first free-form surface mirror 132 may be an optical element to reflect a laser light incident from the anamorphic lens 131.

The second free-form surface mirror 133 may be an optical element to reflect a laser light incident from the first free-form surface mirror 132 to emit the laser light towards the display panel 140.

Using the above-described optical elements having free-form surfaces, the image display apparatus 100 may control a reflection of light and the size of the image display apparatus 100 may be miniaturized. A free-form surface may be a non-rotationally symmetric curved surface. An equation used to define a free-form surface of each of the first free-form surface mirror 132 and the second free-form surface mirror 133 will be described below.

The display panel 140 may form an intermediate image by a laser light incident from the second free-form surface mirror 133. An image light corresponding to the intermediate image may be transferred to a combiner 153 through a plurality of optical elements, to form a virtual image superimposed on a real scene. A light corresponding to an image formed on the display panel 140 may be emitted from an emission side of the display panel 140 to a third free-form surface mirror 151 of an eyepiece optical unit 150.

Also, as shown in FIGS. 2 and 3, the display panel 140 may be located between an optical path from the third free-form surface mirror 151 to the fourth free-form surface mirror 152 and an optical path from the fourth free-form surface mirror 152 to the combiner 153. Based on the above configuration, the eyepiece optical unit 150 may be miniaturized to have a relatively high optical performance.

The display panel 140 may be implemented as, for example, a hologram display device, such as a spatial light modulator (SLM). For example, the image display apparatus 100 may display a holographic image using a hologram display device. In this example, the image display apparatus 100 may display different holographic images to both eyes of an observer, to provide a 3D holographic image to the observer.

Figure 8:
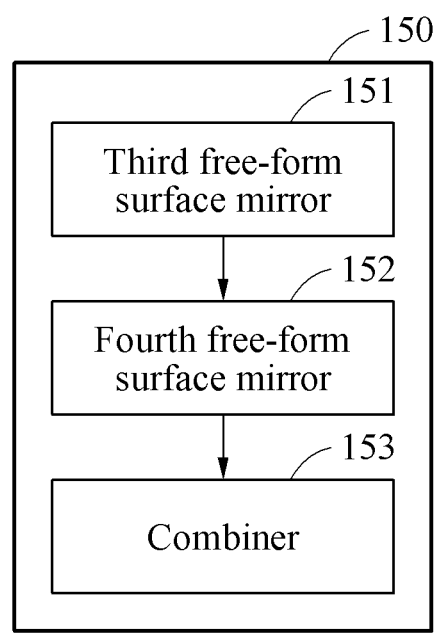
FIG. 8 is a block diagram illustrating a configuration of an eyepiece optical unit according to an exemplary embodiment.

FIG. 8 is a block diagram illustrating a configuration of an eyepiece optical unit according to an exemplary embodiment.

Referring to FIG. 8, the eyepiece optical unit 150 may include a third free-form surface mirror 151, a fourth free-form surface mirror 152, and a combiner 153.

The third free-form surface mirror 151 may be an optical element, for example, a free-form surface mirror of a front end, to reflect an image light of an intermediate image emitted from the display panel 140.

The fourth free-form surface mirror 152 may be an optical element, for example, a free-form surface mirror of a back end, to reflect an image light incident from the third free-form surface mirror 151, to emit the image light towards the combiner 153.

The combiner 153 may receive an image light from the fourth free-form surface mirror 152, and may reflect a portion of the received image light to an eye of an observer. For example, an image light emitted from the fourth free-form surface mirror 152 may be projected onto the combiner 153. The combiner 153 may reflect a portion of a projection light obtained by projecting the image light to the combiner 153 to the eye of the observer, so that the observer may recognize a virtual image. For example, the combiner 153 may be implemented as an element in which an evaporation film functioning as a half mirror is formed on a surface, for example, a reflective surface, of a colorless resin transparent plate on a side of the observer. Although a concave reflective surface of the combiner 153 is described as an example, exemplary embodiments are not limited thereto. For example, the combiner 153 may have a convex reflective surface. Instead of the combiner 153, the windshield glass 10 may also be used.

An example of an optical path in the eyepiece optical unit 150 will be described with reference to FIG. 9.

Figure 9:
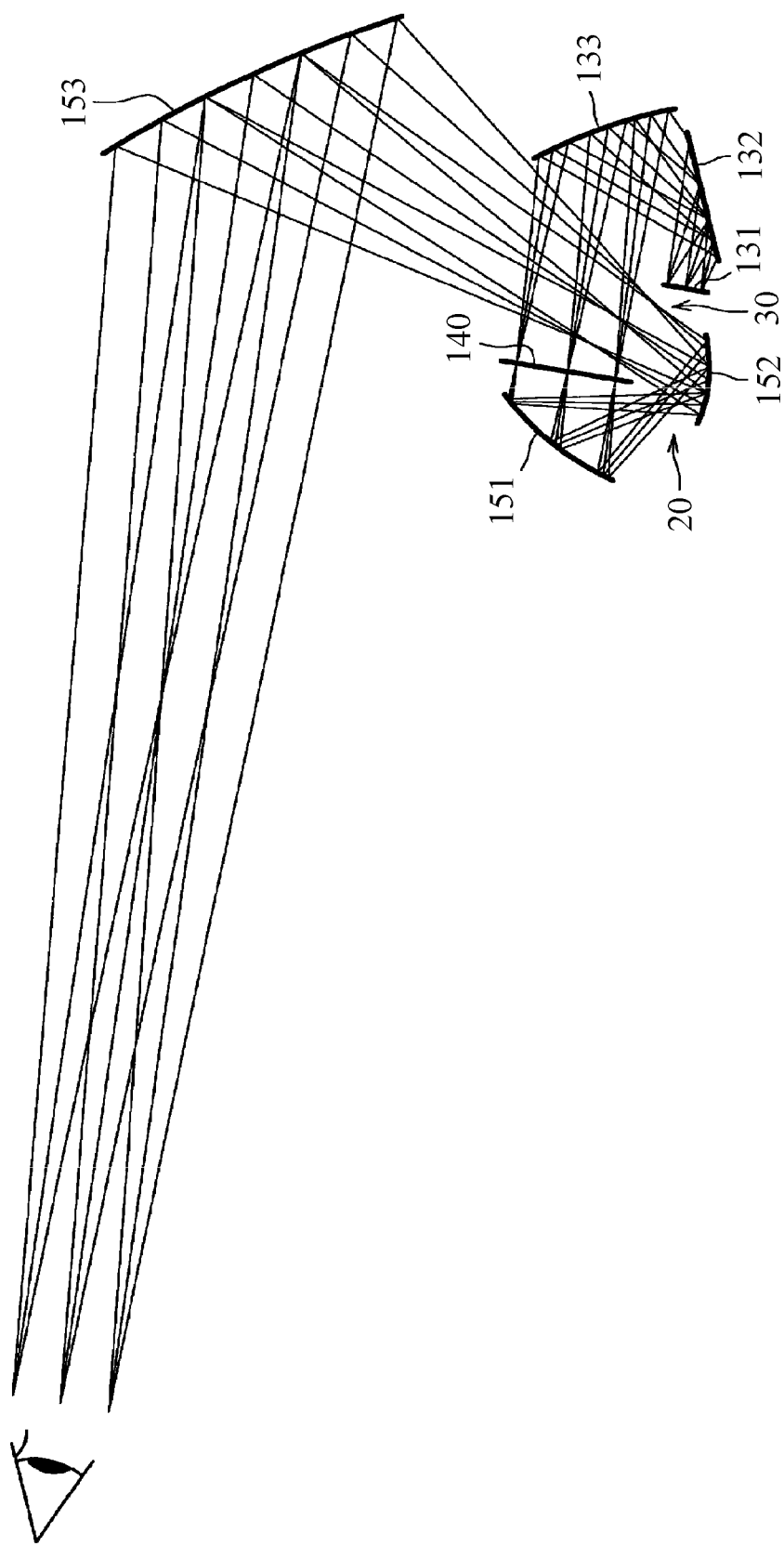
FIG. 9 is a diagram illustrating an example of rays that intersect in an eyepiece optical unit according to an exemplary embodiment.

FIG. 9 is a diagram illustrating an example of rays that intersect in an eyepiece optical unit according to an exemplary embodiment.

Each optical element may be arranged so that at least two image lights intersect between optical paths from the third free-form surface mirror 151 to the fourth free-form surface mirror 152. For example, as shown in FIG. 9, an image light reflected from an arbitrary point of the third free-form surface mirror 151 and an image light reflected from another point of the third free-form surface mirror 151 may intersect at a position 20 and may be incident on the fourth free-form surface mirror 152.

Thus, the optical system of the image display apparatus 100, in particular, the size of the third free-form surface mirror 151 and the fourth free-form surface mirror 152 may be miniaturized. However, a form of an intersection of image lights in the optical paths from the third free-form surface mirror 151 to the fourth free-form surface mirror 152 is not particularly limited.

Also, each element may be arranged so that rays of each image height may intersect between optical paths from the fourth free-form surface mirror 152 to the combiner 153. For example, the fourth free-form surface mirror 152 and the combiner 153 may be arranged so that at least two rays among rays of an image light may intersect between the optical paths from the fourth free-form surface mirror 152 to the combiner 153. Due to an intersection of rays of the image light, an aberration may be improved. For example, as shown in FIG. 9, rays of each image light emitted from the fourth free-form surface mirror 152 may intersect at a position 30 and may be incident on the combiner 153. However, a form of an intersection of rays of each image height in the optical paths from the fourth free-form surface mirror 152 to the combiner 153 is not particularly limited. An equation used to define a free-form surface of each of the third free-form surface mirror 151 and the fourth free-form surface mirror 152 will be described below.

Thus, a diffusion angle of a ray incident on the combiner 153 may increase. An image light reflected by the combiner 153 may be effectively concentrated to an eye of an observer. Therefore, an optical performance of the image display apparatus 100 may be enhanced. Also, even though the image display apparatus 100 is applied to an optical system with a wide field of view (FOV), the optical system may be miniaturized.

Each configuration of the image display apparatus 100 has been described above. As described above, since the image display apparatus 100 is a reflecting optical system, it is possible to reduce or prevent a chromatic aberration from occurring due to a difference in a wavelength. Thus, the image display apparatus 100 may display an image with a relatively high quality without color bleeding.

Figure 10:
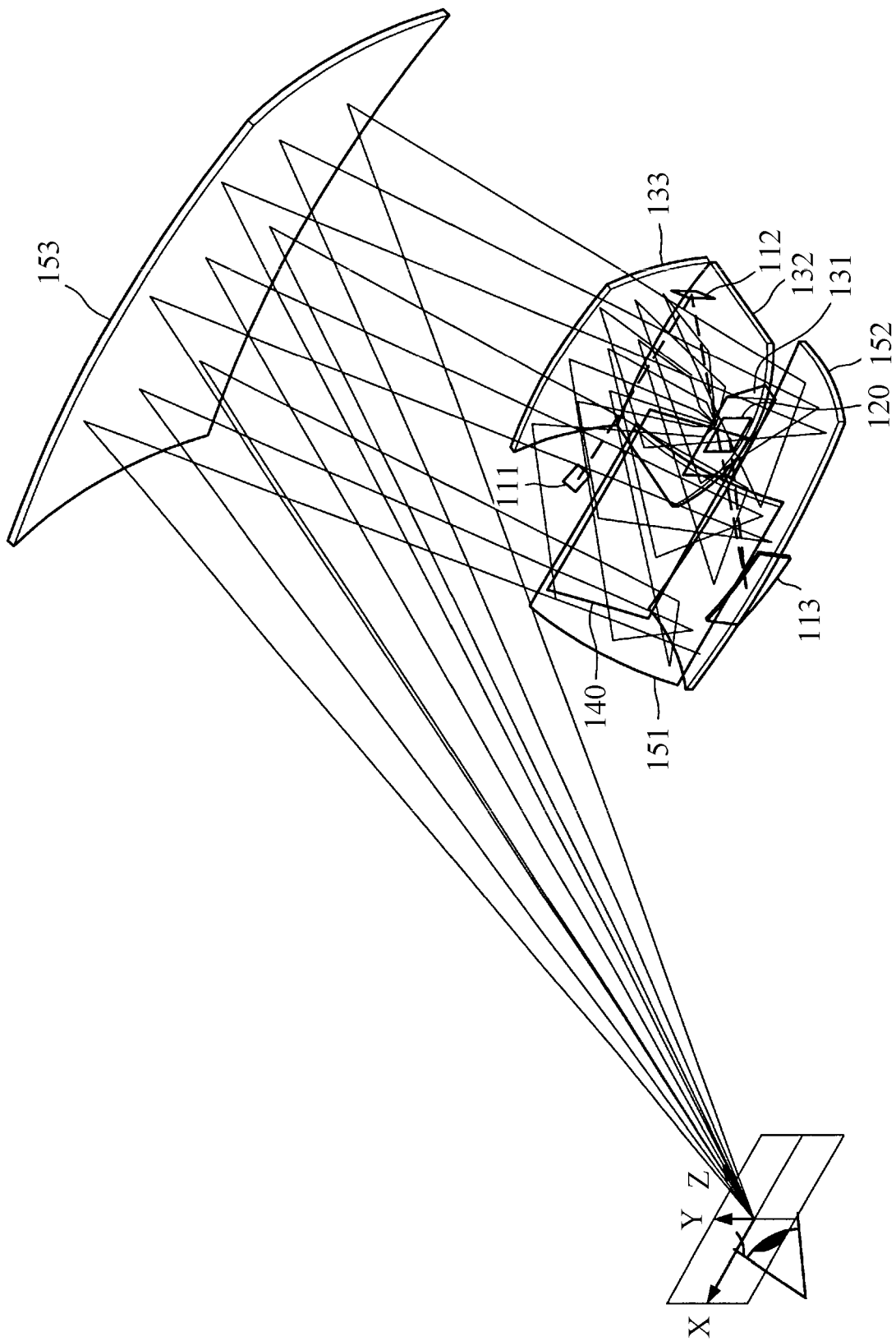
FIGS. 10 and 11 are diagrams illustrating a configuration of an image display apparatus according to an exemplary embodiment.
Figure 11:
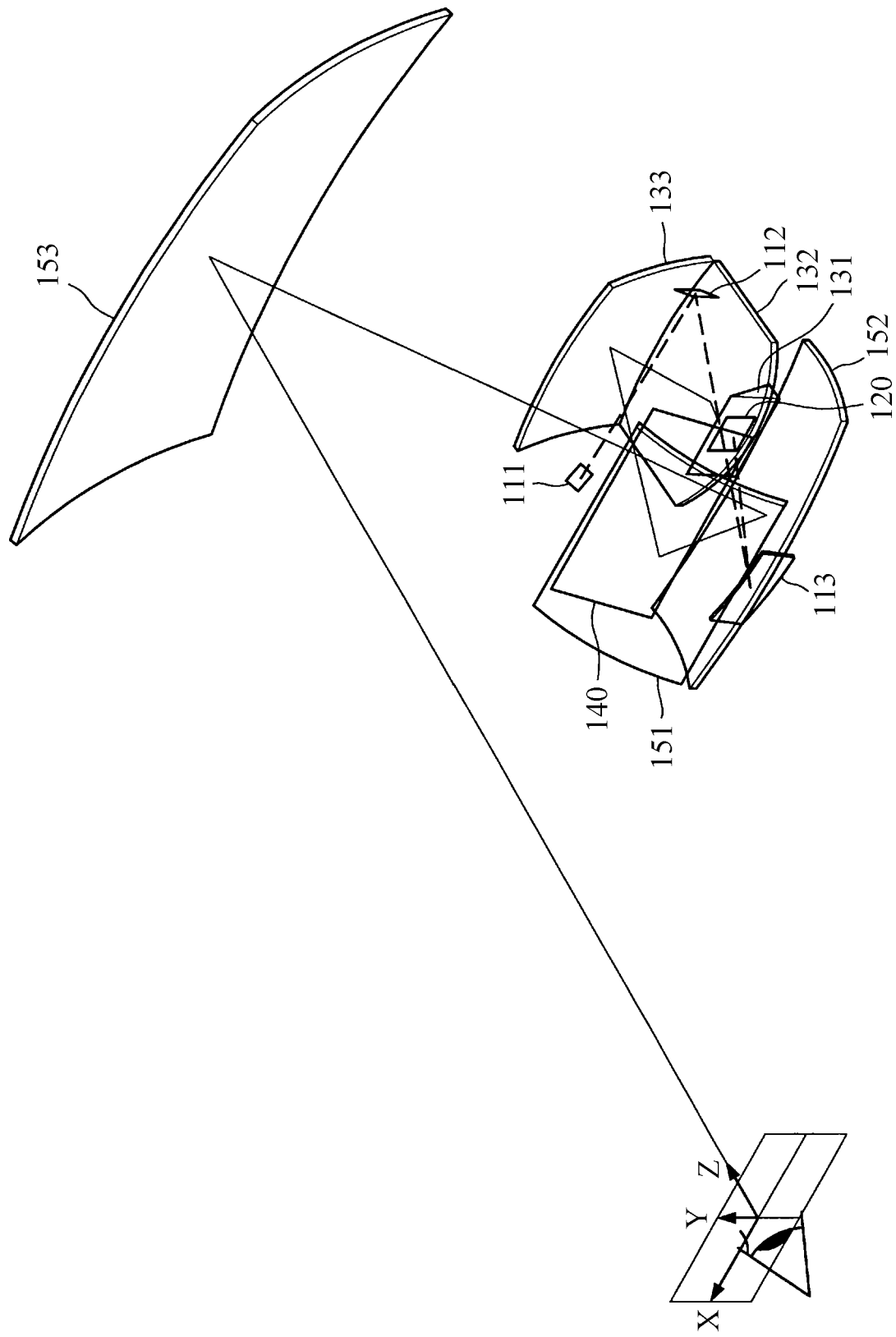

FIGS. 10 and 11 are diagrams illustrating a configuration of an image display apparatus according to an exemplary embodiment.

FIGS. 10 and 11 illustrate an example of a configuration of the image display apparatus 100 including all of the above-described optical elements. FIG. 11 illustrates rays propagating in a central position of each of optical elements of the image display apparatus 100 from a bundle of rays passing through each of the optical elements. However, an arrangement of the optical elements of the image display apparatus 100 is not limited to those of FIGS. 10 and 11.

An example of an equation used to define a free-form surface is described below. For example, an equation used to define a free-form surface of each of the first free-form surface mirror 132 and the second free-form surface mirror 133 included in the illumination optical unit 130 and a free-form surface of each of the third free-form surface mirror 151, the fourth free-form surface mirror 152 and the combiner 153 included in the eyepiece optical unit 150, is described below. When a rectangular coordinate system (x, y, z) based on a vertex of a free-form surface of each of the optical elements is defined, a free-form surface of each of the optical elements may be defined by Equations 1, 2 and 3 shown below. Also, each of coefficients of Equation 1 for each of the optical elements is shown in Table 1 below.

[Equation 1]

$$z = \frac{c \cdot r^2}{1 + \sqrt{1 - (1+k) \cdot c^2 \cdot r^2}} + \sum_{j=2}^{66} C_j \cdot x^m \cdot y^n \quad (1)$$

[Equation 2]

$$j = \frac{(m+1)^2 + m + 3n}{2} + 1 \quad (2)$$

[Equation 3]

$$r^2 = x^2 + y^2 \quad (3)$$

In Equations 1 through 3, x denotes an x-coordinate of a surface, y denotes a y-coordinate of the surface, and z denotes a sag amount of a surface substantially parallel to a z-axis. C denotes a vertex curvature, and may represent 1/radius of curvature. k denotes a conic constant, and $C_j$ denotes a coefficient of a monomial $x^m y^m$ and may represent a free-form surface coefficient.

TABLE 1

|  | Eyepiece optical unit 150 | | | Illumination optical unit 130 | |
|---|---|---|---|---|---|
|  | Combiner 153 | Fourth free-form surface mirror 152 | Third free-form surface mirror 151 | Second free-form surface mirror 133 | First free-form surface mirror 132 |
| Vertex curvature | 0 | 0 | 0 | 0 | 0 |
| Conic coefficient | 0 | 0 | 0 | 0 | 0 |
| Coefficient of x | 0 | 0 | 0 | 0 | 0 |
| Coefficient of y | 0 | 0 | 0 | 1.43.E−01 | −7.54.E−01 |
| Coefficient of $x^2$ | −5.19.E−04 | 6.20.E−04 | 8.21.E−04 | −1.53.E−03 | −1.13.E−03 |
| Coefficient of xy | 0 | 0 | 0 | 0 | 0 |
| Coefficient of $y^2$ | −7.43.E−04 | 4.90.E−03 | −3.21.E−03 | 3.46.E−03 | 1.16.E−03 |
| Coefficient of $x^3$ | 0 | 0 | 0 | 0 | 0 |
| Coefficient of $x^2y$ | 3.85E−07 | −6.34E−06 | −1.40E−06 | −5.25E−05 | 2.00E−05 |
| Coefficient of $xy^2$ | 0 | 0 | 0 | 0 | 0 |
| Coefficient of $y^3$ | 4.37E−07 | 2.16E−06 | −7.30E−06 | −9.95E−06 | −1.32E−05 |
| Coefficient of $x^4$ | −2.57E−10 | 3.50E−09 | 1.16E−08 | 1.99E−07 | 1.36E−08 |
| Coefficient of $x^3y$ | 0 | 0 | 0 | 0 | 0 |
| Coefficient of $x^2y^2$ | −1.39E−09 | −8.60E−09 | 7.02E−09 | −1.29E−07 | −4.60E−07 |
| Coefficient of $xy^3$ | 0 | 0 | 0 | 0 | 0 |
| Coefficient of $y^4$ | −7.71E−10 | 2.53E−07 | −4.67E−09 | −1.96E−07 | 1.14E−07 |
| Coefficient of $x^5$ | 0 | 0 | 0 | 0 | 0 |
| Coefficient of $x^4y$ | 1.73E−12 | −1.73E−11 | −2.28E−10 | 2.48E−09 | −1.94E−09 |
| Coefficient of $x^3y^2$ | 0 | 0 | 0 | 0 | 0 |
| Coefficient of $x^2y^3$ | 2.85E−12 | −7.55E−10 | −2.99E−10 | 9.53E−10 | 5.39E−09 |
| Coefficient of $xy^4$ | 0 | 0 | 0 | 0 | 0 |
| Coefficient of $y^5$ | 2.30E−12 | 1.47E−09 | 3.30E−12 | −1.07E−09 | 7.12E−09 |
| Coefficient of $x^6$ | 1.58E−15 | 5.07E−14 | 6.84E−13 | −2.29E−12 | 1.57E−12 |
| Coefficient of $x^5y$ | 0 | 0 | 0 | 0 | 0 |
| Coefficient of $x^4y^2$ | 1.94E−15 | 2.77E−13 | 1.68E−12 | 8.47E−12 | 3.81E−11 |
| Coefficient of $x^3y^3$ | 0 | 0 | 0 | 0 | 0 |
| Coefficient of $x^2y^4$ | 0 | −1.44E−12 | 5.44E−13 | 4.40E−12 | −5.49E−11 |
| Coefficient of $xy^5$ | 0 | 0 | 0 | 0 | 0 |
| Coefficient of $y^6$ | 0 | −3.87E−11 | −1.29E−12 | −1.74E−12 | −1.67E−10 |
| Coefficient of $x^7$ | 0 | 0 | 0 | 0 | 0 |
| Coefficient of $x^6y$ | 0 | 1.11E−15 | 0 | −1.76E−14 | 2.51E−13 |

An equation to define the anamorphic surface of the anamorphic lens 131 is described. The anamorphic surface may be defined by Equation 4 shown below, when a rectangular coordinate system (x, y, z) having a vertex of the anamorphic surface as an original point is defined. Also, coefficients of Equation 4 are shown in Table 2 below.

[Equation 4]

$$z = \frac{(CUX) \cdot x^2 + (CUY) \cdot y^2}{1 + \sqrt{1 + (1+KX) \cdot (CUX)^2 \cdot x^2 - (1+KY) \cdot (CUY)^2 \cdot y^2}} + AR\{(1-AP) \cdot x^2 + (1+AP) \cdot y^2\}^2 + BR\{(1-BP) \cdot x^2 + (1+BP) \cdot y^2\}^3 + CR\{(1-CP) \cdot x^2 + (1+CP) \cdot y^2\}^4 + DR\{(1-DP) \cdot x^2 + (1+DP) \cdot y^2\}^5 \quad (4)$$

In Equation 4, x denotes the x-coordinate of a surface, y denotes the y-coordinate of a surface, z denotes the sag amount of a surface parallel to a z-axis, CUX denotes the curvature of x, CUY denotes the curvature of y, KX denotes the conic coefficient of x, KY denotes the conic coefficient of y, AR denotes the coefficient of a rotational symmetry of a fourth order, BR denotes the coefficient of a rotational symmetry of a sixth order, CR denotes the coeffiecient of a rotational symmetry of an eighth order, DR denotes the coefficient of a rotational symmetry of a tenth order, AP denotes the coefficient of a non-rotational symmetry of a fourth order, BP denotes the coefficient of a non-rotational symmetry of a sixth order, CP denotes the coefficient of a non-rotational symmetry of an eighth order, and DP denotes the coefficient of a non-rotational symmetry of a tenth order.

TABLE 2

| | |
|---|---|
| CUX | 3.22.E−03 |
| CUY | −1.52.E−03 |
| KY | 0 |
| AR | 0 |
| BR | 0 |
| CR | 0 |
| DR | 0 |
| KX | 0 |
| AP | 0 |
| BP | 0 |
| CP | 0 |
| DP | 0 |

Examples of position coordinates of each of the optical elements of the image display apparatus 100 are described. For example, when a rectangular coordinate system (x, y, z) (based on FIGS. 10 and 11) having a central point of an eye box as an original point is defined, position coordinates of each of the optical elements may be coordinates shown in Tables 3 through 5. Each of position coordinates of Tables 3 through 5 indicates a central position of each of the optical elements. Also, in each of the optical elements, an eccentricity is also described. In the eccentricity, α, β and γ denote angles of inclination when an x-axis, a y-axis and a z-axis are used as axes of rotation, respectively. Positive values (+) of the angles α and β of inclination may indicate angles of a counterclockwise rotation with respect to positive directions, for example, forward directions, of the x-axis and the y-axis, respectively. A positive value (+) of the angle γ of inclination may indicate an angle of a clockwise rotation with respect to a positive direction of the z-axis.

TABLE 3

| | Coordinates (mm) | | | Eccentricity (°) | | |
|---|---|---|---|---|---|---|
| | X | Y | Z | α | β | γ |
| Central point of eye box | 0 | 0 | 0 | 0 | 0 | 0 |
| Combiner 153 | 0 | 0 | 800 | 32.4 | 0 | 0 |
| Fourth free-form surface mirror 152 | 0 | −298.3 | 659.0 | 92.7 | 0 | 0 |
| Third free-form surface mirror 151 | 0 | −211.6 | 607.5 | 149.7 | 0 | 0 |
| Display panel 140 | 0 | −212.4 | 643.5 | 178.7 | 0 | 0 |
| Second free-form surface mirror 133 | 0 | −391.6 | 813.7 | 163.1 | 0 | 0 |
| First free-form surface mirror 132 | 0 | −277.9 | 767.6 | −105.6 | 0 | 0 |
| Anamorphic lens 131 | 0 | −513.5 | 766.9 | 1.2 | 0 | 0 |
| Beam shaper 120 | 0 | −514.6 | 715.5 | 1.2 | 0 | 0 |

TABLE 4

| | Coordinates (mm) | | | Eccentricity (°) | | |
|---|---|---|---|---|---|---|
| | X | Y | Z | α | β | γ |
| Central point of eye box | 0 | 0 | 0 | 0 | 0 | 0 |
| Combiner 153 | 0 | 0 | 750 | 32.4 | 0 | 0 |
| Fourth free-form surface mirror 152 | 0 | −298.3 | 609.0 | 92.7 | 0 | 0 |
| Third free-form surface mirror 151 | 0 | −211.6 | 557.5 | 149.7 | 0 | 0 |
| Display panel 140 | 0 | −212.4 | 593.5 | 178.7 | 0 | 0 |
| Second free-form surface mirror 133 | 0 | −391.6 | 763.7 | 163.1 | 0 | 0 |
| First free-form surface mirror 132 | 0 | −277.9 | 717.6 | −105.6 | 0 | 0 |
| Anamorphic lens 131 | 0 | −513.6 | 712.1 | 1.2 | 0 | 0 |
| Beam shaper 120 | 0 | −514.7 | 660.7 | 1.2 | 0 | 0 |

TABLE 5

| | Coordinates (mm) | | | Eccentricity (°) | | |
|---|---|---|---|---|---|---|
| | X | Y | Z | α | β | γ |
| Central point of eye box | 0 | 0 | 0 | 0 | 0 | 0 |
| Combiner 153 | 0 | 0 | 850 | 32.4 | 0 | 0 |
| Fourth free-form surface mirror 152 | 0 | −298.3 | 709.0 | 92.7 | 0 | 0 |
| Third free-form surface mirror 151 | 0 | −211.6 | 657.5 | 149.7 | 0 | 0 |
| Display panel 140 | 0 | −212.4 | 693.5 | 178.7 | 0 | 0 |
| Second free-form surface mirror 133 | 0 | −391.6 | 863.7 | 163.1 | 0 | 0 |
| First free-form surface mirror 132 | 0 | −277.9 | 817.6 | −105.6 | 0 | 0 |

TABLE 5-continued

|  | Coordinates (mm) | | | Eccentricity (°) | | |
| --- | --- | --- | --- | --- | --- | --- |
|  | X | Y | Z | α | β | γ |
| Anamorphic lens 131 | 0 | −513.4 | 821.5 | 1.2 | 0 | 0 |
| Beam shaper 120 | 0 | −514.5 | 770.1 | 1.2 | 0 | 0 |

Among the above-described optical elements, each of optical elements arranged in front of the display panel 140 may correspond to an off-axis optical system, which is an axis separation optical system, and the display panel 140 and the optical elements of the eyepiece optical unit 150 may correspond to an on-axis optical system. Thus, it is possible to realize an optical system with a relatively high optical performance while satisfying the above-described equations, the position coordinates and the eccentricity. However, this is merely an example, and whether each of the optical elements corresponds to the off-axis optical system or the on-axis optical system may be determined based on various conditions, for example, the above-described equations, the position coordinates, the eccentricity, or a required optical performance.

Figure 12:
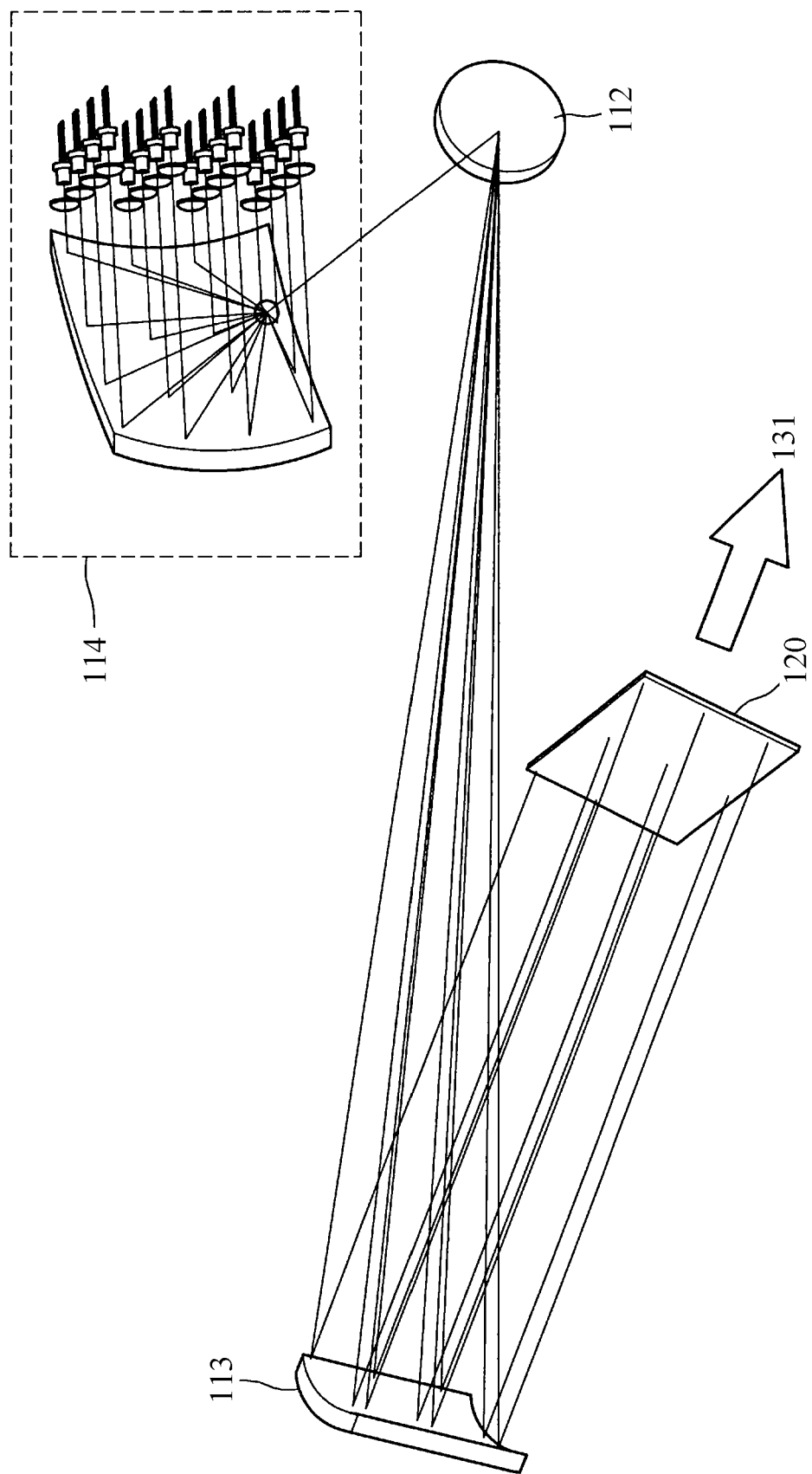
FIG. 12 is a diagram illustrating an example of a configuration of each of a scanning optical unit and a beam shaper according to an exemplary embodiment.
Figure 13:
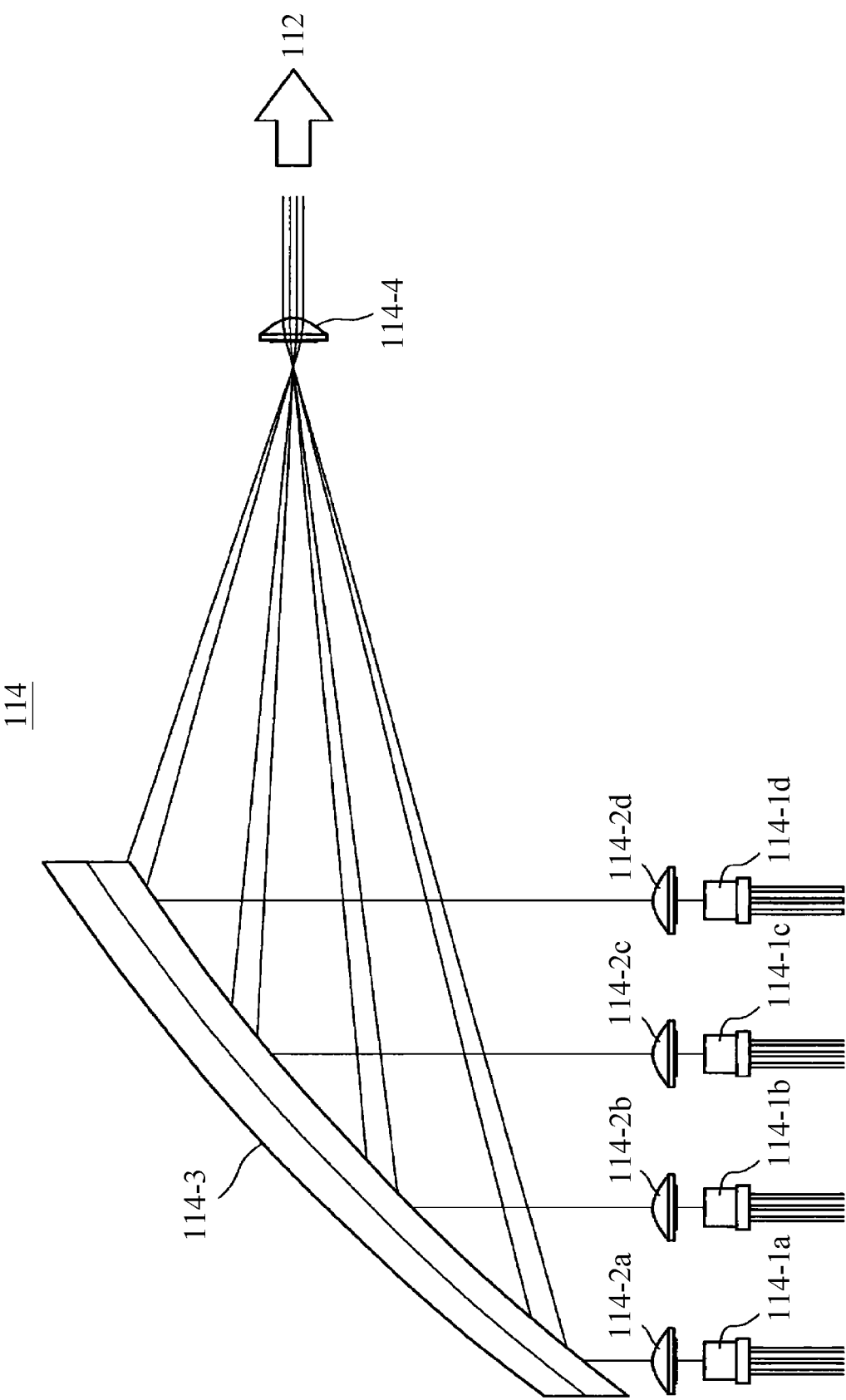
FIG. 13 is a diagram illustrating an example of a configuration of a light source according to an exemplary embodiment.

FIG. 12 is a diagram illustrating an example of a configuration of each of a scanning optical unit and a beam shaper according to an exemplary embodiment. FIG. 13 is a diagram illustrating an example of a configuration of a light source according to an exemplary embodiment.

FIG. 12 illustrates a light source 114 in which semiconductor laser light sources are arranged in a form of an array. Components other than the light source 114 may have the same structure as those of FIGS. 1 through 11.

FIG. 13 illustrates the light source 114 of FIG. 12. As shown in FIG. 13, the light source 114 includes laser light sources 114-1a, 114-1b, 114-1c and 114-1d, collimating lenses 114-2a, 114-2b, 114-2c, 114-2d and 114-4, and a parabolic mirror 114-3.

The laser light sources 114-1a through 114-1d may be optical elements arranged in a form of an array to emit predetermined laser lights. Although FIG. 13 illustrates four laser light sources, that is, the laser light sources 114-1a through 114-1d, a number of laser light sources is not limited thereto and may change based on a size of the parabolic mirror 114-3 or an amount of light to be required. FIG. 12 illustrates sixteen (16) laser light sources in total respectively arranged in four columns and four rows. A wavelength of a laser light emitted from each laser light source is not limited, and laser lights may be combined regardless of a wavelength of each of the laser lights.

Laser lights emitted from the laser light sources 114-1a through 114-1d may pass through the collimating lenses 114-2a through 114-2d respectively corresponding to the laser light sources 114-1a through 114-1d, to be substantially parallel laser lights. The substantially parallel laser lights may be reflected by the parabolic mirror 114-3 to be concentrated to the collimating lens 114-4 located at a focal position of the parabolic mirror 114-3 and to be combined by the collimating lens 114-4.

Figure 14:
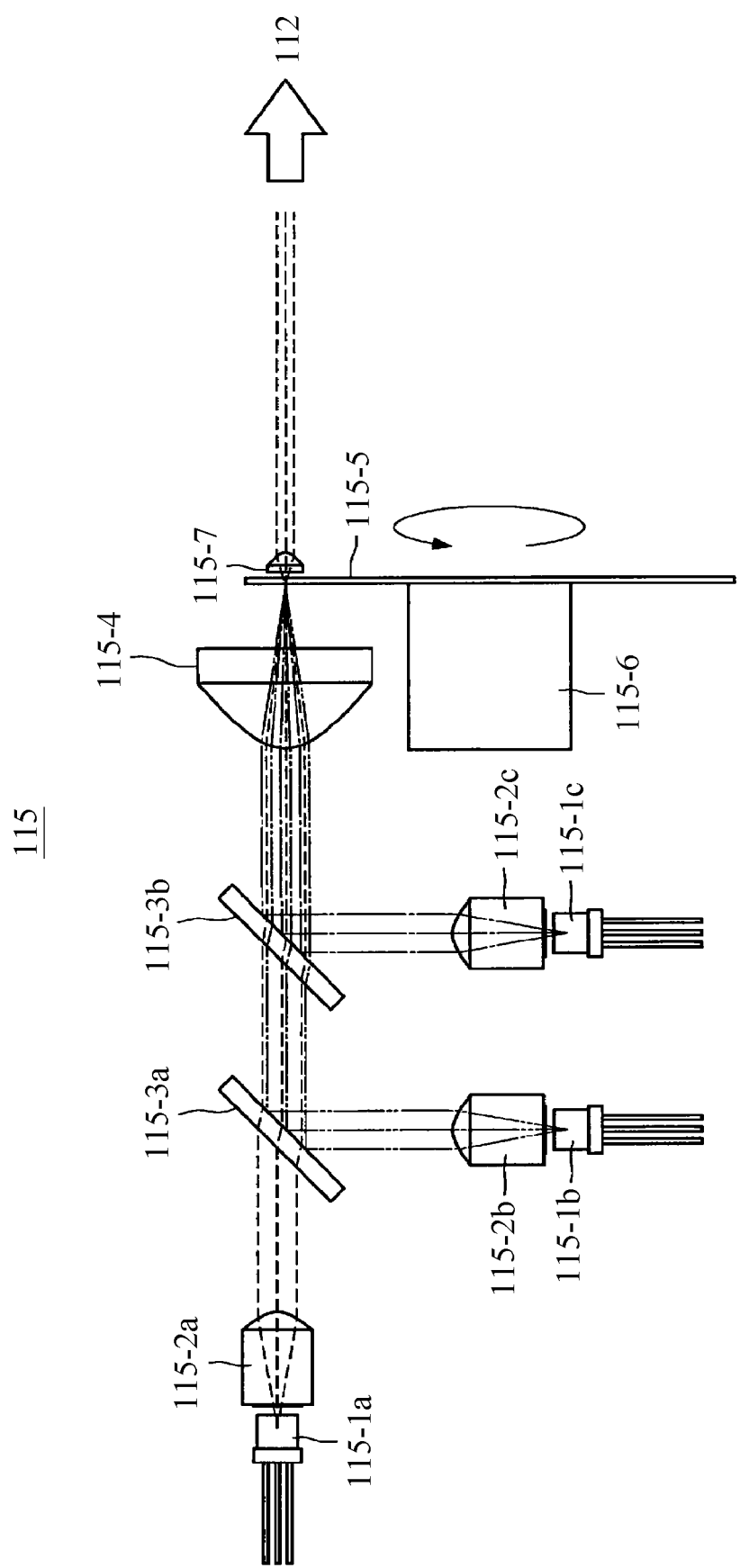
FIG. 14 is a diagram illustrating an example of a configuration of a light source according to an exemplary embodiment.

FIG. 14 is a diagram illustrating an example of a configuration of a light source according to an exemplary embodiment.

A light source 115 of FIG. 14 may mitigate an influence of speckle noise by a laser light. The speckle noise may be a phenomenon in which a bright spot is generated due to an interference between laser lights when a reflective surface or a transmission surface has a fine unevenness. For example, when speckle noise occurs, an image may easily flicker undesirably. Also, because a laser light is in a narrow band, laser lights may easily interfere due to a constant light emitting wavelength, and speckle noise may easily occur.

FIG. 14 illustrates the light source 115. The light source 115 includes a condensing lens 115-4, a diffuser plate 115-5, a motor 115-6 and a collimating lens 115-7. Components other than the light source 115 may have the same structure as those of FIGS. 1 through 11.

Similarly to the light source 111, a white light generated by combining color lights using dichroic mirrors 115-3a and 115-3b may be incident on the condensing lens 115-4. Each of the color lights may be generated by an R light source 115-1a, a G light source 115-1b, a B light source 115-1c, and collimating lenses 115-2a through 115-2c.

The condensing lens 115-4 may concentrate the incident laser light to the diffuser plate 115-5. A laser light diffused by the diffuser plate 115-5 may pass through the collimating lens 115-7 to form a beam that is substantially parallel laser lights. By the beam formed by the collimating lens 115-7, scanning by the MEMS scanner 112 may be performed.

In the diffuser plate 115-5, a state of a speckle of a laser light emitted from the diffuser plate 115-5 may change based on a position at which the laser light arrives. In addition, the diffuser plate 115-5 may be rotated by the motor 115-6, and accordingly the state of the speckle of the laser light emitted from the diffuser plate 115-5 may change during a rotation.

Thus, the speckle noise may be averaged and reduced. For example, speckle noise may occur in an emitted light for an arbitrary time, however, the diffuser plate 115-5 may be rotated by the motor 115-6 at a high speed, for example, a speed greater than or equal to a predetermined speed, so that the speckle noise may be averaged and may be reduced to an extent that the speckle noise may not be visually recognized. Thus, brightness of an image may be reduced.

The above-described configuration is merely an example, and the above-described optical element may be changed to another optical element having a similar function.

The image display apparatus 100 may be applied to a HUD as described above, however, exemplary embodiments are not limited thereto. For example, the image display apparatus 100 may be applicable to a head-mounted display (HMD).

Based on the exemplary embodiments of the image display apparatus, it is possible to concentrate an improved image light to an eye of an observer.

The exemplary embodiments described herein may be implemented using hardware components, software components, or a combination thereof. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular, however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to the above-described exemplary embodiments may be recorded in non-transitory computer-readable media including program instructions to implement various operations which may be performed by a computer. The media may also include, alone or in combination with the program instructions, data files, data structures, and the like. The program instructions recorded on the media may be those specially designed and constructed for the purposes of the exemplary embodiments, or they may be of the well-known kind and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer using an interpreter. The described hardware devices may be configured to act as one or more software modules in order to perform the operations of the above-described exemplary embodiments, or vice versa.

While this disclosure includes exemplary embodiments, it will be apparent to one of ordinary skill in the art that various changes in form and details may be made in these exemplary embodiments without departing from the spirit and scope of the claims and their equivalents. The exemplary embodiments described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An image display apparatus comprising:
   a scanning optical unit configured to scan a laser light;
   a beam shaper configured to receive the laser light scanned by the scanning optical unit in a direction normal to a surface of the beam shaper;
   an illumination optical unit configured to transmit the laser light emitted from the beam shaper to a display panel, the illumination optical unit comprising an anamorphic lens and two reflective optical elements having free-form surfaces;
   the display panel configured to display an image based on the laser light transmitted by the illumination optical unit; and
   an eyepiece optical unit configured to concentrate an image light emitted from the display panel to an eye of an observer, the eyepiece optical unit comprising three reflective optical elements having free-form surfaces,
   wherein the display panel is provided between the illumination optical unit and an eyepiece optical unit along a propagation path of the laser light.

2. The image display apparatus of claim 1, further comprising:
   a first controller configured to control a position of the beam shaper based on position information of the eye.

3. The image display apparatus of claim 2, wherein
   the scanning optical unit comprises a laser scanner, and
   the first controller is further configured to control the laser scanner to control the position of the beam shaper.

4. The image display apparatus of claim 2, wherein the first controller is further configured to control the position of the beam shaper and to control the image light to be concentrated based on a change in a position of the eye in a direction perpendicular to an optical axis of the eye.

5. The image display apparatus of claim 1, further comprising:
   a second controller configured to control a position of the beam shaper based on a position information of the eye.

6. The image display apparatus of claim 5, wherein the second controller is further configured to control the beam shaper to move with respect to an optical axis of the eye.

7. The image display apparatus of claim 5, wherein the second controller is further configured to concentrate the image light by controlling the position of the beam shaper based on the beam shaper moving with respect to an optical axis of the eye.

8. The image display apparatus of claim 1, wherein the beam shaper comprises one of a diffractive optical element (DOE), a holographic optical element (HOE), and a diffuser plate.

9. The image display apparatus of claim 1, further comprising:
   a third controller configured to control content of the image based on a position information of the eye.

10. The image display apparatus of claim 9, wherein the third controller is further configured to provide a right eye image and a left eye image for the right eye and the left eye, respectively.

11. The image display apparatus of claim 1, wherein the scanning optical unit comprises:
    a light source configured to emit the laser light;
    a laser scanner configured to scan the laser light emitted from the light source; and
    a mirror configured to reflect the laser light scanned by the laser scanner toward the beam shaper.

12. The image display apparatus of claim 11, wherein
    the laser scanner comprises a microelectromechanical systems (MEMS) scanner, and
    the mirror comprises a parabolic mirror.

13. The image display apparatus of claim 11, wherein the light source comprises:
    a condensing lens configured to concentrate the laser light to a diffuser plate;

the diffuser plate configured to scatter the laser light concentrated by the condensing lens;

a collimating lens configured to emit parallel rays by collimating the laser light scattered by the diffuser plate to the laser scanner; and a motor configured to rotate the diffuser plate.

14. The image display apparatus of claim 1, wherein the eyepiece optical unit comprises:

a front free-form surface mirror configured to reflect the image light emitted from the display panel;

a back free-form surface mirror configured to reflect the image light reflected by the front free-form surface mirror; and a combiner configured to concentrate the image light to the eye by reflecting the image light reflected by the back free-form surface mirror.

15. The image display apparatus of claim 14, wherein the front free-form surface mirror and the back free-form surface mirror are disposed so that at least two image lights reflected from the front free-form surface mirror intersect between optical paths from the front free-form surface mirror to the back free-form surface mirror.

16. The image display apparatus of claim 14, wherein the combiner and the back free-form surface mirror are disposed so that at least two image lights reflected from the back free-form surface mirror intersect between optical paths from the back free-form surface mirror to the combiner.

17. The image display apparatus of claim 1, wherein the image display apparatus is a head-up display (HUD).

18. The image display apparatus of claim 1, wherein the display panel comprises a hologram display device.

19. The image display apparatus of claim 11, wherein the light source is configured to generate a white light by combining a red laser light, a green laser light and a blue laser light.

20. The image display apparatus of claim 11, wherein the light source comprises semiconductor laser light sources disposed in an array.

* * * * *